US012735040B2

(12) United States Patent
Caredda et al.

(10) Patent No.: US 12,735,040 B2
(45) Date of Patent: Sep. 15, 2026

(54) METHOD FOR OPERATING AN ACTIVE ROLL SUPPORT SYSTEM OF A MOTOR VEHICLE

(71) Applicant: Dr. Ing. h.c. F. Porsche Aktiengesellschaft, Stuttgart (DE)

(72) Inventors: David Caredda, Ebersbach (DE); Jochen Liebold, Stuttgart (DE); Markus Eisenbarth, Stuttgart (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 77 days.

(21) Appl. No.: 18/390,082

(22) Filed: Dec. 20, 2023

(65) Prior Publication Data

US 2024/0246539 A1 Jul. 25, 2024

(30) Foreign Application Priority Data

Jan. 25, 2023 (DE) ..................... 10 2023 101 753.5

(51) Int. Cl.

*B60W 40/103* (2012.01)
*B60G 17/016* (2006.01)

(Continued)

(52) U.S. Cl.

CPC ..... *B60W 30/18145* (2013.01); *B60G 17/016* (2013.01); *B60G 17/0162* (2013.01); *B60W 10/22* (2013.01); *B60W 30/045* (2013.01); *B60W 40/06* (2013.01); *B60W 40/064* (2013.01); *B60W 40/103* (2013.01); *B60W 40/107* (2013.01); *B60G 2400/104* (2013.01); *B60G 2400/106* (2013.01); *B60G 2400/61* (2013.01); *B60G 2400/64* (2013.01);

(Continued)

(58) Field of Classification Search

None

See application file for complete search history.

(56) References Cited

U.S. PATENT DOCUMENTS 4,486,839 A * 12/1984 Mazur .................. B60T 8/1703 246/182 R
5,066,041 A * 11/1991 Kindermann ...... B60G 17/0162 280/5.506

(Continued)

FOREIGN PATENT DOCUMENTS

DE 4133060 A1 4/1993
DE 102008014104 A1 10/2008

(Continued)

*Primary Examiner* — Maria S Ayad
(74) *Attorney, Agent, or Firm* — Buchanan Ingersoll & Rooney PC

(57) ABSTRACT

A method for operating an active roll support system of a motor vehicle, in which a roll moment distribution is regulated below a sideslip angle threshold on the basis of an actual grip reserve of a rear axle relative to a front axle of the motor vehicle. A wheel load is acquired for each of the wheels of the front axle and for each of the wheels of the rear axle and the acquired wheel loads are used as feedback variables in a control loop for regulating the roll moment distribution to calculate the actual grip reserve of the rear axle and compare it with a target grip reserve of the rear axle and from this determine a control deviation for adapting the roll moment distribution.

6 Claims, 1 Drawing Sheet

(51) Int. Cl.

*B60W 10/22* (2006.01)
*B60W 30/045* (2012.01)
*B60W 30/18* (2012.01)
*B60W 40/06* (2012.01)
*B60W 40/064* (2012.01)
*B60W 40/107* (2012.01)
*B60W 40/13* (2012.01)
*B60W 50/00* (2006.01)
*B60W 30/182* (2020.01)

(52) U.S. Cl.

CPC .... *B60G 2600/09* (2013.01); *B60G 2800/214* (2013.01); *B60G 2800/9122* (2013.01); *B60W 30/182* (2013.01); *B60W 2040/1307* (2013.01); *B60W 2040/133* (2013.01); *B60W 2050/0008* (2013.01); *B60W 2050/0031* (2013.01); *B60W 2510/182* (2013.01); *B60W 2520/125* (2013.01); *B60W 2520/20* (2013.01); *B60W 2530/20* (2013.01); *B60W 2540/10* (2013.01); *B60W 2552/40* (2020.02); *B60W 2720/18* (2013.01)

(56) References Cited

U.S. PATENT DOCUMENTS 5,164,903 A * 11/1992 Lin ...................... B60K 28/165 180/197
5,510,986 A * 4/1996 Williams ........... B60G 17/0182 701/38
6,088,637 A * 7/2000 Acker .................... B62D 17/00 280/5.506
6,092,815 A * 7/2000 Rutz .................... B60G 17/018 280/5.506
6,226,587 B1 * 5/2001 Tachihata ............... B60K 28/16 701/72
8,321,088 B2 * 11/2012 Brown ................ B60T 8/17552 701/72
8,521,349 B2 * 8/2013 Yu ......................... B60W 10/08 701/22
11,518,362 B1 * 12/2022 Shupe .................... B60K 6/485
12,017,642 B2 * 6/2024 Luo ....................... B60W 10/18
2002/0035871 A1 * 3/2002 Pallot .................... B60T 8/1755 73/488
2002/0139599 A1 * 10/2002 Lu ....................... B60T 8/17554 303/146
2002/0161505 A1 * 10/2002 Reich ..................... B60K 31/12 701/72
2004/0176899 A1 * 9/2004 Hallowell ........... B60L 15/2036 701/84
2004/0199321 A1 * 10/2004 Lin .................... B60T 8/17551 180/197
2006/0006615 A1 * 1/2006 Mizuta ................ B60W 10/184 280/5.508
2006/0074530 A1 * 4/2006 Meyers ............. B60K 23/0808 701/1
2010/0041512 A1 * 2/2010 Silveri ..................... B60K 6/52 477/3
2010/0161194 A1 * 6/2010 Turski ..................... B60T 8/175 701/87
2010/0211280 A1 * 8/2010 Cayol ................... B60W 10/08 701/70
2010/0318262 A1 * 12/2010 Mizuta .............. B60G 21/0558 701/38
2011/0130901 A1 * 6/2011 Mori ..................... B60W 10/14 180/65.265
2013/0144476 A1 * 6/2013 Pinto ....................... B60L 50/00 903/930
2014/0045652 A1 * 2/2014 Carlson ................... F02P 9/005 477/109
2016/0229291 A1 * 8/2016 Mao ................... B60K 23/0808
2017/0350331 A1 * 12/2017 Shost .................... F02D 41/008
2017/0370342 A1 * 12/2017 Nagashima ............. F02D 17/02
2018/0037222 A1 * 2/2018 Mahabadi ......... B60W 50/0097
2018/0257631 A1 * 9/2018 Fodor ................... B60W 10/18
2018/0257635 A1 * 9/2018 Meyer .................... B60K 6/448
2018/0370507 A1 * 12/2018 Eckert ....................... B60T 8/36
2019/0291591 A1 * 9/2019 Suzuki .................... B60L 3/104
2020/0062069 A1 * 2/2020 Sorniotti .......... B60G 17/01908
2020/0271550 A1 * 8/2020 Svantesson ............ G01N 19/02
2021/0039691 A1 * 2/2021 Tione .................... B60T 17/228
2021/0252976 A1 * 8/2021 Nahrwold ............ B60K 17/354
2023/0166751 A1 * 6/2023 Bower .................. B60W 20/10 701/22
2024/0131877 A1 * 4/2024 De Pinto ............... B60W 50/14

FOREIGN PATENT DOCUMENTS

DE 102009022302 A1 11/2010
DE 102021201831 A1 9/2022

* cited by examiner

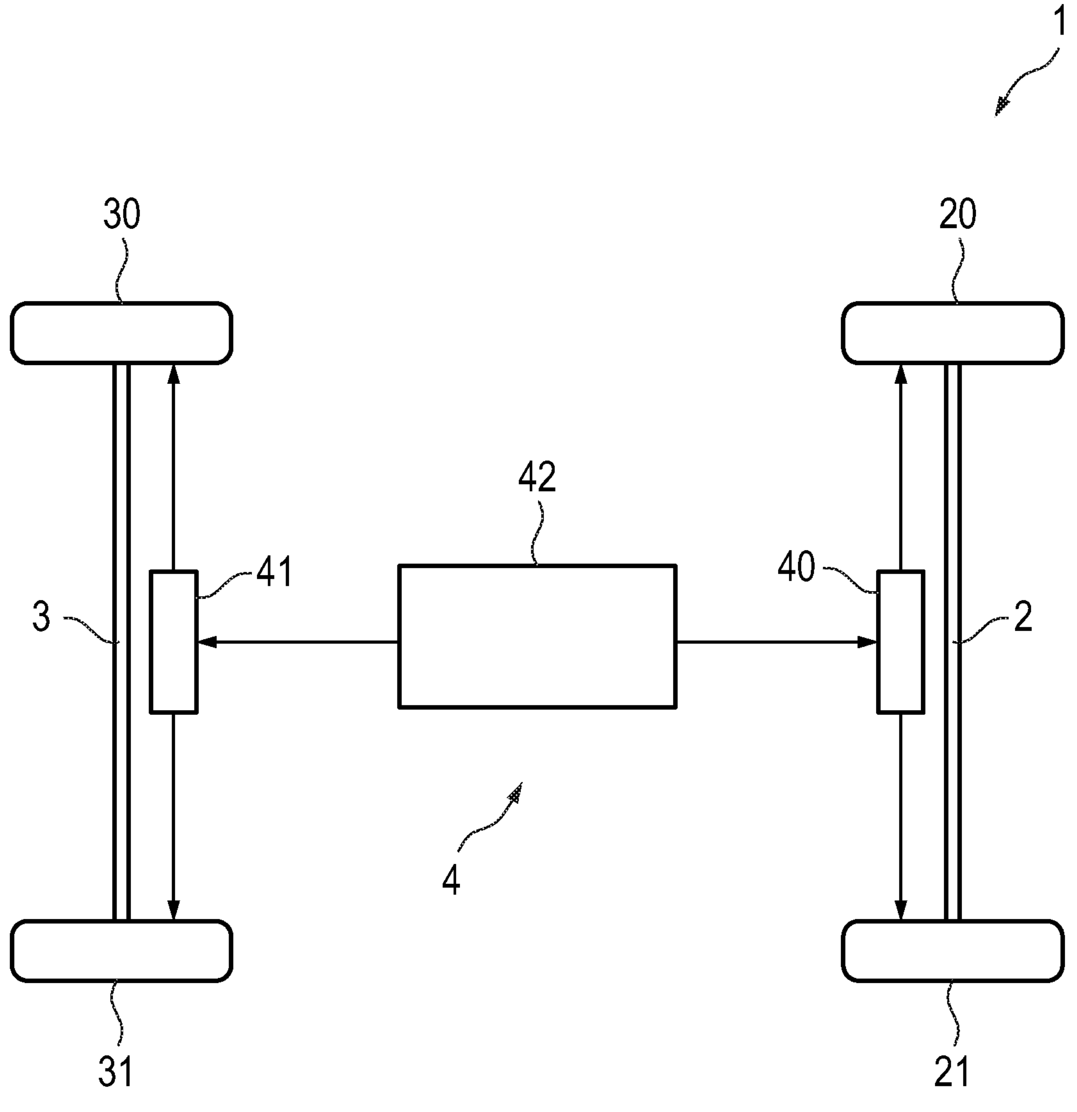
1
30
20
42
41
40
3
2
4
31
21

METHOD FOR OPERATING AN ACTIVE ROLL SUPPORT SYSTEM OF A MOTOR VEHICLE

CROSS-REFERENCE TO RELATED APPLICATION

This application claims priority to German Patent Application No. 10 2023 101 753.5, filed Jan. 25, 2023, the content of such application being incorporated by reference herein in its entirety.

FIELD OF THE INVENTION

The present invention relates to a method for operating an active roll support system of a motor vehicle.

BACKGROUND OF THE INVENTION

Active roll support systems for motor vehicles, which are configured to provide roll support when the vehicle is driving by means of a roll moment distribution in order to minimize rolling movements of the motor vehicle when cornering, are already known from the prior art in a variety of embodiments. Up to now, roll moment distribution in active roll support systems is largely pilot controlled only via the application. The only feedback relating to the current driving state of the motor vehicle are corresponding oversteering or understeering signals, which have often proven to be of little use in practical applications. A major reason for this is that the oversteering or understeering signals are not accurate enough for different road surface friction coefficients, for different tires and for different vehicle configurations. The feedback of the current driving state represented by the oversteering or understeering signals is furthermore delayed.

DE 10 2021 201 831 A1, which is incorporated by reference herein, discloses a method for increasing traction of a motor vehicle with an active roll stabilizer, wherein spinning of a wheel is detected and a wheel contact force of the spinning wheel is reduced by adjusting roll stabilizer settings.

A method for controlling/regulating the driving behavior of a motor vehicle, wherein a roll moment distribution or roll moment support is adapted to a road surface friction coefficient, is known from DE 10 2008 014 104 A1, which is incorporated by reference herein.

SUMMARY OF THE INVENTION

Described herein is a method for operating an active roll support system of a motor vehicle, in which a roll moment distribution is regulated below a sideslip angle threshold on the basis of an actual grip reserve of a rear axle relative to a front axle of the motor vehicle, wherein a wheel load is acquired for each of the wheels of the front axle and for each of the wheels of the rear axle and the acquired wheel loads are used as feedback variables in a control loop for regulating the roll moment distribution to calculate the actual grip reserve of the rear axle and compare it with a target grip reserve of the rear axle and from this determine a control deviation for adapting the roll moment distribution. The method according to the invention advantageously enables improved operation of an active roll support system of a motor vehicle and improved regulation of the roll moment distribution.

In one embodiment, it is proposed that a grip potential available for longitudinal and lateral forces is calculated for each of the wheels of the front axle and for each of the wheels of the rear axle using at least some of the following variables, preferably using all of the following variables: wheel load, slip angle, slip, tire temperature, wheel camber and coefficient of friction.

In one embodiment, it is provided that a currently available grip potential of the front axle is calculated from the grip potentials of the wheels of the front axle and a currently available grip potential of the rear axle is calculated from the grip potentials of the wheels of the rear axle.

The actual grip reserve of the rear axle can preferably be determined by calculating the difference between the currently available grip potential of the rear axle and the currently available grip potential of the front axle.

In one embodiment, it is provided that at least some of the following variables, preferably all of the following variables are used to calculate the target grip reserve of the rear axle: driving speed, lateral acceleration, change in lateral acceleration, longitudinal wheel load transfer, brake pressure, accelerator pedal position, sideslip angle, coefficient of friction of the tires and driving program.

In an advantageous further development, it is possible that the roll moment distribution is controlled as a function of the sideslip angle and the driving speed when the sideslip angle threshold is exceeded.

A variable sideslip angle threshold which is set as a function of the driving mode can preferably be used.

BRIEF DESCRIPTION OF THE DRAWING

Further features and advantages of the present invention will become apparent from the following description of a preferred embodiment example with reference to the accompanying FIGURE.

FIG. 1 shows a schematically highly simplified illustration of a motor vehicle 1 equipped with an active roll support system 4.

DETAILED DESCRIPTION OF THE INVENTION

The motor vehicle 1 comprises a front axle 2 with two wheels 20, 21 and a rear axle 3 with two wheels 30, 31 in a per se known manner. The motor vehicle 1 further comprises an active roll support system 4, which is configured to provide roll support for the motor vehicle 1 by means of a roll moment distribution when the motor vehicle 1 is driving. This roll support is intended to minimize or, ideally, completely prevent rolling movements of the motor vehicle 1 when cornering.

The roll support system 4 comprises a first roll stabilizer means 40, which is associated with the front axle 2 of the motor vehicle 1 and acts on the two wheels 20, 21 of the front axle 2, in particular on the wheel suspensions of the two wheels 20, 21 of the front axle 2. The roll support system 4 further comprises a second roll stabilizer means 41, which is associated with the rear axle 3 of the motor vehicle 1 and acts on the two wheels 30, 31 of the rear axle 3, in particular on the wheel suspensions of the two wheels 30, 31 of the rear axle 3. The roll support system 4 also comprises a control device 42 for operating the roll stabilizer means 40, 41 when the motor vehicle 1 is driving.

When carrying out a method for operating the active roll support system 4, the control device 42 is used to calculate the respective grip potential available for longitudinal and lateral forces for each of the wheels 20, 21 of the front axle 2 and for each of the wheels 30, 31 of the rear axle 3 taking into account the following variables, some of which are fixed predetermined variables and some of which are measured values, which are acquired using corresponding sensor means of the motor vehicle 1 that are not explicitly shown here: wheel load, wherein the wheel load forms a feedback path of the actual control variable "roll moment distribution" in the control loop, slip angle, slip, tire temperature, wheel camber, coefficient of friction of the tires.

The current utilization of the grip potential for longitudinal and lateral forces is thus calculated for each of the four corner regions of the motor vehicle 1, i.e., front left, front right, rear left and rear right, taking into account the longitudinal and lateral forces currently acting when the vehicle is driving. This is then used to calculate the currently available grip potential of the rear axle 3 and the currently available grip potential of the front axle 2.

Subsequently, the difference between the two grip potentials, i.e., the difference between the currently available grip potential of the rear axle 3 and the currently available grip potential of the front axle 2, is calculated, which represents the actual grip reserve of the rear axle 3 relative to the front axle 2 and to which the roll moment distribution is regulated. The feedback into the control loop for the roll moment distribution is achieved via the wheel loads, which are included in the calculation of the individual grip potential of all four wheels 20, 21, 30, 31 of the motor vehicle 1.

At least some of the following variables, preferably all of the following variables, are preferably used to determine a target grip reserve of the rear axle 3, from which a control deviation and thus also an adjustment of the roll moment distribution is calculated together with the actual grip reserve of the rear axle 3: driving speed, lateral acceleration, change in lateral acceleration, longitudinal wheel load transfer, brake pressure, accelerator pedal position, sideslip angle, coefficient of friction of the tires and driving program.

When a sideslip angle threshold is exceeded, the control device 42 switches to a sideslip angle- and driving speed-dependent control of the roll moment distribution. If the sideslip angle falls below the threshold again, the grip reserve of the rear axle 3 is once again regulated in the manner described above. Preferably, a variable sideslip angle threshold, which is set as a function of the driving mode of the motor vehicle 1, is used.

What is claimed is:

1. A method for operating an active roll support system of a motor vehicle, in which a roll moment distribution is regulated below a sideslip angle threshold on a basis of an actual grip reserve of a rear axle relative to a front axle of the motor vehicle, said method comprising:

(a) acquiring, by plural sensors of the motor vehicle, a wheel load for each wheel of the front axle and for each wheel of the rear axle while the motor vehicle is being driven;

(b) calculating a grip potential available for longitudinal and lateral forces for each of the wheels of the front axle and for each of the wheels of the rear axle using at least a tire temperature and a wheel camber;

(c) calculating a currently available grip potential of the front axle from the grip potentials of the wheels of the front axle, and calculating a currently available grip potential of the rear axle from the grip potentials of the wheels of the rear axle;

(d) calculating, by a controller of the motor vehicle, the actual grip reserve of the rear axle by calculating a difference between the currently available grip potential of the rear axle and the currently available grip potential of the front axle;

(e) calculating, by the controller, a target grip reserve of the rear axle based on at least an accelerator pedal position and brake pressure;

(f) comparing, by the controller, the actual grip reserve of the rear axle with the target grip reserve of the rear axle;

(g) determining, by the controller, based on the comparison at step (f), a control deviation for adapting the roll moment distribution; and (h) adjusting, by the controller, the roll moment distribution and the actual grip reserve of the rear axle based on the target grip reserve of the rear axle while the motor vehicle is being driven.

2. The method according to claim 1, further comprising using the accelerator pedal position, the brake pressure, and at least one of the following variables to calculate the target grip reserve of the rear axle: driving speed, lateral acceleration, change in lateral acceleration, longitudinal wheel load transfer, sideslip angle, coefficient of friction of the tires and driving program.

3. The method according to claim 1, further comprising controlling the roll moment distribution as a function of the sideslip angle and a driving speed when the sideslip angle threshold is exceeded.

4. The method according to claim 1, further comprising using a variable sideslip angle threshold which is set as a function of the driving mode.

5. The method according to claim 1, wherein the method further comprises:

acting on the wheel suspension of each of the wheels of the front axle and the rear axle according to the adjustment of the roll moment distribution and the actual grip reserve.

6. The method according to claim 1, wherein the wheel load for each wheel of the front axle and for each wheel of the rear axle are used as feedback variables in a control loop for regulating the roll moment distribution.

* * * * *